United States Patent
Ash et al.

[15] 3,694,498
[45] Sept. 26, 1972

[54] ALPHA, ALPHA-DIMETHYL-BETA, BETA-DIMERCAPTO-N-LOWER ALKYL-(PHENYL AND SUBSTITUTED PHENYL) ETHYLAMINES

[72] Inventors: Arthur B. Ash, Lathrup Village; Calvin L. Stevens, Detroit, both of Mich.

[73] Assignee: Ash Stevens, Inc., Detroit, Mich.

[22] Filed: Sept. 11, 1970

[21] Appl. No.: 71,375

Related U.S. Application Data

[62] Division of Ser. No. 809,012, March 20, 1969, Pat. No. 3,578,682.

[52] U.S. Cl..........260/570.5 S, 260/327, 260/348 R, 260/348.6, 260/501.21, 260/566 R, 260/566 D, 260/570.5 C, 260/570.8 R, 260/592, 424/277, 424/330
[51] Int. Cl...............................................C07c 87/28
[58] Field of Search................................260/570.5 S

[56] References Cited

FOREIGN PATENTS OR APPLICATIONS 1,354,813  2/1964  France...................260/570.5

OTHER PUBLICATIONS

Magnusson, " Acts Chem. Scand.," Vol. 17, pages 273– 275 (1963).

Primary Examiner—Robert V. Hines
Attorney—Miller, Morris, Poppas & McLeod and Ian C. McLeod

[57] ABSTRACT

Dimercapto compounds characterized as alpha, alpha-dimethyl-beta, beta-dimercapto-N-lower alkyl-(phenyl and substituted phenyl)ethylamines of the structural formula:

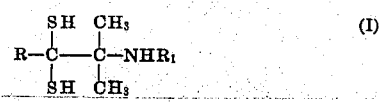

where R is phenyl and substituted phenyl and $R_1$ is lower alkyl containing one to eight carbon atoms are described. Trithiolane condensation derivatives of the dimercapto compounds (I) prepared by oxidation with the elimination of hydrogen sulfide are also described. The dimercapto compounds (I) are generally prepared by reacting an alpha, alpha-dimethyl-beta-N-lower alkyl imine-(phenyl and substituted phenyl) ethylamine of the structural formula:

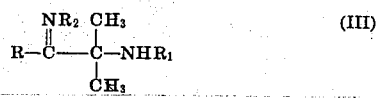

where R and $R_1$ are as in the dimercapto compounds (I) and $R_2$ is a lower alkyl group containing one to eight carbon atoms with hydrogen sulfide in an inert anhydrous polar organic solvent for the imino compounds (III) at temperatures less than the decomposition temperature of the dimercapto compounds (I) and until (I) is formed and precipitates from the reaction mixture. The imino compounds (III) are preferably prepared by reacting a compound of the structural formula:

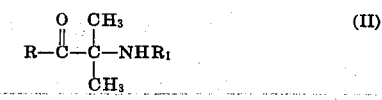

with a lower alkyl amine ($R_2$-$NH_2$) containing one to eight carbon atoms. The product dimercapto compounds (I) and trithiolanes are particularly useful as antimalarials in mammals.

5 Claims, No Drawings

ALPHA, ALPHA-DIMETHYL-BETA, BETA-DIMERCAPTO-N-LOWER ALKYL-(PHENYL AND SUBSTITUTED PHENYL) ETHYLAMINES

This application is a divisional of our earlier application Ser. No. 809,012, filed 1969 Mar. 20, now U.S. Pat. No. 3,578,682.

BACKGROUND OF THE INVENTION

The present invention relates to antimalarial compounds and the process for their preparation. More particularly the present invention relates to alpha, alpha-dimethyl-beta, beta-dimercapto-N-lower alkyl-(phenyl and substituted phenyl) ethylamines of the structural formula:

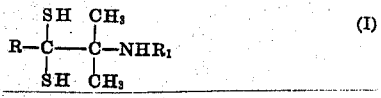

where R is phenyl and substituted phenyl and $R_1$ is lower alkyl containing one to eight carbon atoms, their preparation and use as antimalarial compounds.

The dimercapto compounds (I) are not known to the prior art. Mercapto compounds are not known to be useful as antimalarials. The preparation of unrelated dimercapto compounds for other uses is known to the prior art. In general, the corresponding keto or imino compound is reacted with hydrogen sulfide to form the dimercapto compound. Prior art references showing such reactions are: T. L. Cairns, et al, J. Am. Chem. Soc. 74, 3982 (1952); G. A. Buchtold, et al, J. Am. Chem. Soc. 81, 3148 (1959); E. Campaigne, e al, J. Org. Chem., 27, 3760 (1962); C. Djerassi, et al, J. Org. Chem. 27, 1041 (1962); M. Demuynck et al, Bull. Chim. Soc., France 2126 (1962); French Patent No. 1,354,813; German Patent No. 1,173,894; Netherlands Application 284,140 (1964); B. Magnusson, Acta. Chem. Scand. 17, 273 (1963); and H. Barrea, et al, J. Org. Chem. 27, 641 (1962). None of these prior art references show a reaction of hydrogen sulfide with secondary amino compounds (a basic group) such as the alpha, alpha-dimethyl-beta-N-lower alkyl imine-(phenyl and substituted phenyl) ethylamines (III) preferably used as starting materials in the process of the present invention.

OBJECTS

It is therefore an object of the present invention to provide novel dimercapto compounds and trithiolane derivatives thereof, particularly useful as antimalarials.

It is further an object of the present invention to provide a process for the preparation of such compounds.

These and other objects will become increasingly apparent to those skilled in the art by reference to the following description.

SUMMARY OF THE INVENTION

The present invention relates to alpha, alpha-dimethyl-beta, beta-dimercapto-N-lower alkyl-(phenyl and substituted phenyl) ethyl-amines which are particularly useful as antimalarials in mammals of the structural formula:

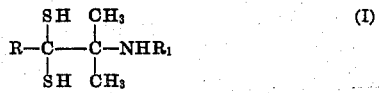

wherein R is phenyl and substituted phenyl such as, ortho, meta and para substituents preferably halo (fluro, chloro, iodo and bromo) substituents. The present invention also relates to trithiolane derivatives of the dimercapto compounds (I) of the present invention which have been found to be active as antimalarials characterized as 2,5-di-(phenyl and substituted phenyl)-2,5-bis-(2-N-lower alkyl amino isopropyl)-1,3,4-trithiolane and non-toxic pharmaceutically acceptable acid addition salts thereof of the structural formula:

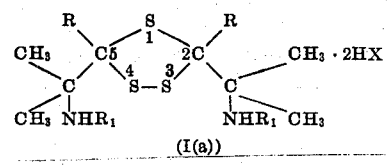

wherein R and $R_1$ are as in the dimercapto compound (I). Non-toxic salts (HX) include those formed by acids such as hydrochloric, hydrobromic, sulfuric, phosphoric, acetic, tartaric, citric, p-toluene sulfonic acid and the like although hydrochloric is preferred.

The dimercapto compounds (I) of the present invention are prepared by the process which comprises reacting an alpha, alpha-dimethyl-beta-N-lower alkyl imine-(phenyl and substituted phenyl) ethylamine of the structural formula:

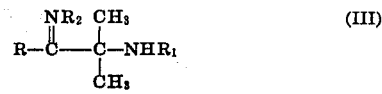

wherein R and $R_1$ are as before and $R_2$ is lower alkyl containing one to eight carbon atoms with hydrogen sulfide in an inert anhydrous polar organic solvent for the imino compound (III) at temperatures less than the decomposition temperatures of the dimercapto compound (I) until the dimercapto compound (I) precipitates from the reaction mixture. The reaction is generally conducted at a temperature between about 10° and 30°C in a polar organic solvent such as ethanol or other lower alkanols containing one to eight carbon atoms wherein the product dimercapto compound (I) is insoluble in the solvent and precipitates from the reaction mixture. Preferably the preparation of the product (I) is started from an alpha-lower alkyl amino isobutyro substituted and unsubstituted phenyl ketone of the structural formula:

which is reacted with a lower alkyl amine containing one to eight carbon atoms ($R_2NH_2$) to form the imino compound (III) since these ketones (II) are more readily available as shown for instance by U.S. Patent No.

3,082,255 and Stevens et al, J. Org. Chem. 27, 4392 (1962). It is most preferred to conduct the reaction of the ketone (II) with the lower alkyl amine ($R_2NH_2$) and the subsequent reaction of the imine (III) with hydrogen sulfide by eliminating the steps of separation and purification of the imine (III) from the reaction mixture.

The trithiolanes (Ia) are derived from the dimercapto compounds (I) and can be produced by allowing the dimercapto compounds (I) to be exposed to the atmosphere for a long period of time. Essentially, the reaction proceeds by the elimination of hydrogen sulfide with condensation of two molecules of the dimercapto compound (I) and by the oxidative formation of the sulfur to sulfur bond. It has been found that this reaction can be accelerated by heating with or without polarorganic solvent or by subjecting the dimercapto compound (I) to oxidative conditions or both as described more fully hereinafter.

DESCRIPTION OF THE INVENTION

The following equations illustrate the preferred sequence of reactions used to prepare the dimercapto compounds (I) and trithiolane derivatives (Ia) starting from the ketones (II):

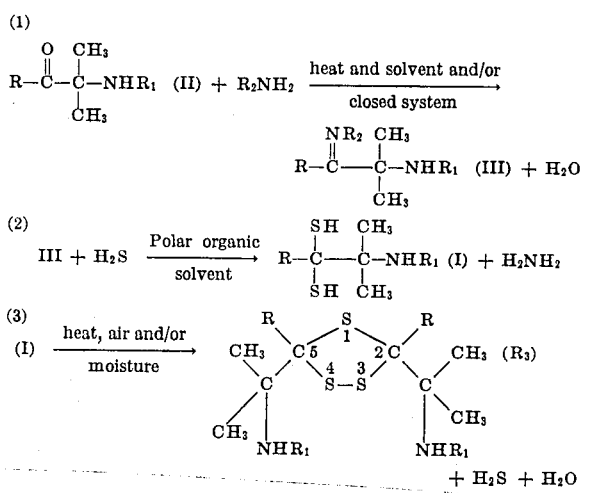

where R, $R_1$, and $R_2$ are as before. Reaction 1 is conducted either in an alcohol solvent or in a closed system, since the lower alkyl amines are gaseous at elevated temperatures. The reaction temperature range is generally between about 70° and 150°C. Reaction 2 is conducted by adding gaseous hydrogen sulfide to a solution of III in a polar organic solvent at a temperature usually between about 15° and 30°C which is less than the decomposition temperature of the dimercapto compound (I). (I) precipitates from the reaction mixture as a crystalline solid at ambient or lower temperatures. Reaction 3 proceeds at temperatures between about 25° and 100°C with elimination of hydrogen sulfide by an oxidative formation of the sulfur to sulfur bond in which the element hydrogen is eliminated, probably as water.

Having generally described the present invention the following is a specific description.

SPECIFIC DESCRIPTION

The following Examples 1 to 3 illustrate the process for the preparation of the antimalarial compounds of the present invention. Temperatures are given in degrees Centigrade.

EXAMPLE 1

Synthesis of alpha, alpha-dimethyl-beta, beta-dimercapto-N-butyl phenethylamine and trithiolane.

A solution of 22.0 grams of N-butyl-beta-(butylimino)-alpha, alpha-dimethyl phenethylamine (C. L. Stevens and C. H. Chang, J. Org. Chem. 27, 4392 (1962) in 150 ml. of ethyl alcohol (J. T. Baker reagent grade, denatured No. 3A) was placed in a 2-necked flask equipped with a gas dispersion tube and gas outlet tube (no-drying tube). Hydrogen sulfide was passed through the solution at 25° at a rate such that most of the gas was absorbed. The solution temperature increased slightly during the addition. After about one hour, a solid crystallized from the solution. Hydrogen sulfide addition was continued for another 30 minutes. The solution was allowed to stand under a nitrogen atmosphere for one hour at 25°,followed by 20 minutes at 0°. The crystalline material was filtered, washed with 100 ml. of ethyl alcohol and dried for two hours at 25° to give 17.0 grams (77 percent yield) of a powdery yellow solid, melting point 123°-$x$°, with evolution of hydrogen sulfide.

Analysis: Calculated for: $C_{14}H_{23}NS_2$: C 62.40; H 8.60; N 5.20; S 23.80. Found: C62.42; H8.67; N5.42; S23.73.

Minimum exposure of the product to the atmosphere is recommended to prevent the formation of the corresponding trithiolane. A rubber dam was used during filtration to minimize exposure to air. The product is insoluble in ether, ethanol, water, acetone and common organic solvents. Storage under nitrogen at -20° to 0° is recommended.

2,5-Diphenyl-2,5-bis-(2-N-butylaminoisopropyl)-1,3,4-trithiolane dihydrochloride The dimercapto compound prepared in the first part of this Example (5g), was refluxed with ethanol (100ml.) for one hour. A small amount of insoluble material was separated by filtration. The clear yellow filtrate was concentrated to give a yellow oil. The oil was dissolved in ether (100ml.) and treated with a saturated solution of hydrogen chloride in isopropanol. A white precipitate, 0.45g, melting point 190°–202°, was obtained which was recrystallized from ethanol/ether to give 0.4g. of colorless trithiolane dihydrochloride, melting point 216°–218°, decomposition.

Analysis: Calculated for $C_{28}H_{44}N_2S_3Cl_2$: C, 58.40; H, 7.65; N, 4.87; Cl, 12.34; S, 16.70. Found: C, 58.53; H, 8.05; N, 4.78; Cl, 12.93; S, 16.19.

EXAMPLE 2

Synthesis of alpha, alpha-dimethyl-beta, beta-dimercapto-N-n-butyl-p-chlorophenethylamine and trithiolane.

N-n-Butyl-beta-n-butylimino-alpha, alpha-dimethyl-p-chlorophenethylamine

N-Butylamine (480 grams, 6.58 moles), ethanol (1,200 ml.) and 1,2-epoxy-1-methoxy-2-methyl-1-p-chlorophenylpropane (600 grams, 2.82 moles) were added to a 3-liter flask and refluxed for 48 hours. Solvents were removed under reduced pressure and fresh ethanol (1,200 ml.) and n-butylamine (600 grams) added. The mixture was refluxed an additional 48 hours, stripped and the product distilled. There was obtained 748 grams (86 percent) of product, boiling point 94°/0.025 mm.

Analysis: Calculated for $C_{18}H_{29}N_2Cl$: C, 69.99; H, 9.46; N, 9.07; Cl, 11.48. Found: C, 69.84; H, 9.37; N, 8.93; Cl, 11.37.

alpha, alpha-Dimethyl-beta, beta-dimercapto-N-n-butyl-p-chlorophenethylamine

A solution of N-n-butyl-beta-n-butylimino-alpha, alpha-dimethyl-p-chlorophenethylamine (150 grams, 0.487 mole) in ethanol (750 ml.) was saturated with stirring at room temperature with hydrogen sulfide. The resultant precipitate, a light yellow solid, was collected by filtration and washed with anhydrous ethanol. The solid was then slurried in anhydrous ethanol (800 ml.). The product was collected again by filtration and dried in vacuo at room temperature. After thorough drying, the product weighed 114 grams (78 percent), melting point 120°–121.5°. The product should be stored in a cold box or a refrigerator under an inert gas atmosphere.

Analysis: Calculated for $C_{14}H_{22}ClNS_2$: C, 55.33; H, 7.30; N, 4.61; Cl, 11.67; S, 21.10. Found: C, 55.05; H, 7.20; N, 4.40; Cl, 11.90; S, 20.90.

Preparation of starting materials.

p-Chloroisobutyrophenone:

To a 3-liter, 3-necked flask outfitted with stirrer, condenser and addition funnel were added magnesium turnings (56.0 grams, 2.3 g atoms) and a small amount of ether (50 ml.). A solution of p-bromochlorobenzene (430 grams, 2.25 moles) in ether (1 liter) was added slowly over a 2 hour period. After the Grignard mixture was refluxed for 1 hour, isobutyronitrile (156 grams, 2.26 moles) in ether was added slowly. The mixture solidified when the addition was nearly completed. More ether (100 ml.) was added and the yellow heterogeneous mixture was refluxed for 2 hours. Dilute hydrochloric acid (6N, 1 liter) was added slowly and the mixture was refluxed for 5 hours. The layers were separated. The aqueous layer was extracted with two portions of benzene (400 ml. each). The combined organic extracts were washed successively with water, saturated potassium carbonate and saturated sodium chloride. After drying ($MgSO_4$) and removal of solvents, distillation afforded 342 grams (83%) of p-chloroisobutyrophenone, boiling point 80°/1.25 mm.

alpha-Bromo-p-chloroisobutyrophenone:

Carbon tetrachloride (500 ml.) and p-chloroisobutyrophenone (330 grams, 1.8 mole) were placed in a 3-liter, 3-necked flask. A solution of bromine (290 grams, 1.8 mole) in carbon tetrachloride (200 ml.) was added slowly. After the liberated HBr was removed under reduced pressure, the mixture was washed successively with water, sodium thiosulfate solution and distilled water. Residual water was removed by azeotropic distillation with the carbon tetrachloride. Distillation yielded 468 grams (97 percent), boiling point 81°/0.03 mm, of alpha-bromo-p-chloroisobutyrophenone.

1,2-Epoxy-1-methoxy-2-methyl-1-p-chlorophenyl-propane:

To a solution (90 ml.) of sodium methoxide in methanol (25 percent) at 0°–5° (ice bath) was added alpha-bromo-p-chloroisobutyrophenone (68 grams, 0.26 mole) in methanol (60 ml.). The mixture was stirred 30 minutes at ice bath temperature after the addition was completed. The mixture was poured over ice and extracted with petroleum ether (three times, 150 ml.). The extracts were washed with ice-water and dried ($MgSO_4$). Distillation gave 44.5 grams (76 percent) of the epoxyether, boiling point 58°–59°/0.25 mm.

Preparation of Trithiolane:

2,5-Di-(p-chlorophenyl)-2,5-bis-(2-N-butylaminoisopropyl)-1,3,4-trithiolane dihydrochloride 2.

The title compound was prepared by the four following procedures from alpha, alpha-dimethyl-beta, beta-dimercapto-N-n-butyl-p-chlorophenethylamine prepared above.

The products isolated from all four procedures, were identical in all respects, as established by undepressed mixture melting points and identical infrared spectra.

The corresponding 2,5-diphenyl analog (without a chlorine atom in the para position), was also prepared by the first procedure as can be seen from Example 1.

1. Heating a suspension of compound (I) in ethanol

The dimercapto compound prepared in the first part of this Example 2 (10 grams) was suspended in ethanol (400 ml.) and refluxed on a steam bath for one hour. The reaction mixture was cooled, filtered and the clear filtrate was concentrated under reduced pressure. The residue was dissolved in ether (400 ml.), filtered to remove a small amount of a solid, and the filtrate was treated with a saturated solution of hydrogen chloride in isopropanol. A white precipitate was separated and recrystallized from ethanol/ether to give 280 mg. of trithiolane dihydrochloride, melting point 218°–220°. The mother liquors were combined, evaporated to dryness and recrystallized several times from ethanol/ether to give 700 mg. of trithiolane dihydrochloride, melting point 216°–218°. A sample for analysis was obtained by recrystallization from ethanol/ether, melting point 218°–220°.

Analysis: Calculated for $C_{28}H_{42}Cl_4N_2S_3$: C, 52.17; H, 6.57; N, 4.35; S, 14.92. Found: C, 52.23; H, 6.75; N, 4.46; S, 14.95.

2. Heating compound (I) neat at 80°

The dimercapto compound (1.1 g) was placed on a watch-glass and placed in an oven at 80° for 16 hours. A red, gummy material was obtained which was dissolved in ether. An insoluble portion (20 mg.) was removed by filtration. The clear ethereal filtrate was treated with isopropanol-hydrogen chloride to give the trithiolane dihydrochloride (130 mg) which was identical in all respects with the trithiolane dihydrochloride obtained under procedure (1).

3. Passing air through a suspension of compound (I)

The dimercapto compound (1 g) was suspended in ethanol (50 ml.) at room temperature and a stream of air was bubbled through the suspension. Hydrogen sulfide was evolved immediately; this was detected by collecting the evolved gas in a solution of lead acetate to form insoluble lead sulfide. After one hour, gas evolution ceased. The reaction solution was evaporated to dryness. The resulting oily residue was converted to the trithiolane dihydrochloride salt as described under procedure (1). The yield was 150 mg, melting point 218°–220° (ethanol/ether). The product was identical in all respects with the compounds obtained by methods (1) and (2).

4. Heating of dimercapto compound (I) in isopropanol-hydrogen chloride

The dimercapto compound (I) (5g) prepared in the first part of this Example, was dissolved in isopropanol saturated with dry hydrogen chloride (50 ml.). The solution was heated on a steam bath for two hours while a slow stream of air was bubbled through the solution. After cooling to room temperature, the solvent and hydrogen chloride were removed under reduced pressure and a fresh isopropanol (20 ml.) was added to the residue. After refrigerating for several hours, the white precipitate was separated and washed with cold isopropanol/ether. The yield was 2.2 g (41 percent), melting point 218°–220° decomposition. The product was identical in all respects with the ones obtained under procedures 1 to 3.

EXAMPLE 3

Preparation of alpha, alpha-dimethyl-beta, beta-dimercapto-N-ethyl-p-chlorophenethylamine.

The above dimercapto compound was prepared by the same reaction sequence used for the synthesis of the n-butyl analog of Example 2.

1-(p-Chlorophenyl)-2-methyl-2-ethylamino-propane-hydrochloride:

A solution, prepared from 1,2-epoxy-1-methoxy-2-methyl-1-p-chlorophenyl propane of Example 2, (10.5 grams, 0.05 mole), anhydrous ethylamine (4.5 grams, 6.6 ml, 0.1 mole) and anhydrous ethanol (30 ml), was refluxed for 48 hours. Solvent and excess ethylamine were removed under reduced pressure. The residue was treated with 3N aqueous hydrochloric acid. A colorless precipitate separated which was leached with ether to remove any unreacted epoxyether. The precipitate was then washed with cold water, dried in vacuo and recrystallized from ethanol/ether. The yield of the amino propanone as the hydrochloride, based on the epoxyether, was 8.2 grams (62 percent), melting point 291°–293°.

Analysis : Calculated for $C_{12}H_{17}Cl_2NO$: C, 54.97; H, 6.54; N, 5.34; Cl, 27.05. Found: C, 55.11; H, 7.78; N, 5.37; Cl, 27.09.

Pure aminopropanone as the hydrochloride (8 grams) was suspended in 10 percent aqueous sodium hydroxide and the suspension was extracted with ether. The ether layer was washed with water, dried ($K_2CO_3$) and the solvent was evaporated to give 6 grams of the aminopropanone as the free base, as an oil. The oil was used in the next reaction without further treatment.

alpha, alpha-dimethyl-beta, beta-dimercapto-N-ethyl-p-chlorophenethylamine:

The aminopropanone (6 grams) and ethylamine (10 ml.) were heated 40 hours at 100° in a closed steel vessel. The reaction mixture was cooled, transferred to a round bottom flask and the excess of ethylamine was removed under reduced pressure. The thick brown oily N-ethyl-beta-butylimine-alpha, alpha-dimethyl-p-chlorophenethylamine was analyzed by infrared spectroscopy. A strong imine absorption occurred at 6.05 microns and a small carbonyl absorption appeared at 5.95 microns. The crude imine was dissolved in ethanol (70 ml.) and saturated with hydrogen sulfide with stirring. The light yellow dimercapto compound was precipitated, filtered, and slurried in ethanol (100 ml.). The product dimercapto compound was separated again, and dried in vacuo at room temperature. The yield of dimercapto compound was 5.1 grams (70 percent) calculated on the aminopropanone), melting point 143°–145°, decomposition.

Analysis: Calculated for $C_{12}H_{18}NClS_2$: C, 52.24; H, 6.58; N, 5.08; S, 23.25. Found: C, 52.98; H, 6.79; N, 4.83; S, 22.39.

All attempts to crystallize this compound were unsuccessful. The compound is insoluble at room temperature in common solvents, such as acetonitrile, ethanol, methanol, chloroform and benzene. Solution of the compound by heating in the presence of these solvents results in the liberation of hydrogen sulfide, indicating the formation of the trithiolane. The compound is slightly soluble in dimethylsulfoxide and dimethylformamide at room temperature but evolution of hydrogen sulfide again occurs, indicating that the formation of the trithiolane occurs in the solution process. An analytical sample was prepared by multiple washing with cold ethanol.

The antimalarial compounds of the present invention have been shown to be effective in the treatment of malaria-infected (interperitoneal injection of Plasmod in bergei) mice. The mice employed were inbred ICR/Ha Swiss mice and the antimalarial compounds were injected subcutaneously in solution or suspension in sterile sesame oil, peanut oil, or other pharmaceutically acceptable oil. The effectiveness of the antimalarial compounds is measured by the increase in life of the mice relative to untreated controls.

The results for three dimercapto compounds are shown in Tables I, II and III. The results show that the life span of the malaria-infected mice is significantly prolonged and that, at certain dose levels, the mice are considered to be cured of malaria. It is significant that no toxic deaths are reported even at the highest dosages, i.e., 640 milligrams per kilogram of body weight. The results for two trithiolanes are reported in Tables I(a) and II(a). While these compounds are less effective than the dimercapto compounds, the survival time of the malaria-infected mice is prolonged significantly; in one case (Example 2), one or more of the mice survived 14 or more days, indicating effective activity of the compound as indicated by the conventional designation of "Active".

TABLE I

Alpha, alpha-dimethyl-beta, beta-dimercapto-N-butyl phenethylamine (Example 1)

| No. of tests | Animal | No. | Sex | 6 days Rx | Route | Dose (mg./kg.) | Daily mortality (day/No.) | Cures | 1 MSTT | 2 MSTC | 3 T-C | 4 Tox | 5 MSTX | Result |
|---|---|---|---|---|---|---|---|---|---|---|---|---|---|---|
| 1 | Mice | 5 | F | 3 | SC | 40 | 06/02 07/03 | 00 | 6.6 | 6.2 | .4 | 00 | 00 | |
| 1 | do | 5 | F | 3 | SC | 160 | 06/02 07/02 08/01 | 00 | 6.8 | 6.2 | .6 | 00 | 00 | |
| 1 | do | 5 | F | 3 | SC | 640 | 13/01 14/01 17/01 | 02 | .0 | 6.2 | | 00 | 00 | Alive after 14 days. |
| 1 | do | 5 | F | 3 | SC | 640 | 13/01 14/01 17/01 19/01 25/01 | 00 | 17.6 | 6.2 | 11.4 | 00 | 00 | Active. |

TABLE I—Continued

Alpha, alpha-dimethyl-beta, beta-dimercapto-N-butyl phenethylamine (Example 1)

| No. of tests | Animal | No. | Sex | 6 days Rx | Route | Dose (mg./kg.) | Daily mortality (day/No.) | Cures | 1 MSTT | 2 MSTC | 3 T-C | 4 Tox | 5 MSTX | Result |
|---|---|---|---|---|---|---|---|---|---|---|---|---|---|---|
| 1 | do | 5 | F | 3 | SC | 160 | 06/03 07/02 | 00 | 6.4 | 6.6 | .2 | 00 | 00 | |
| 1 | do | 5 | F | 3 | SC | 320 | 06/02 07/03 | 00 | 6.6 | 6.6 | .0 | 00 | 00 | |
| 1 | do | 5 | F | 3 | SC | 640 | 12/01 13/01 14/01 | 02 | .0 | 6.6 | | 00 | 00 | Alive after 14 days. |

1. Mean survival time treated mice (days).
2. Mean survival time control mice (days).
3. Change in survival time (days).
4. Toxic deaths.
5. Mean survival time toxicity.
6. Number of days post infection chemical therapy was initiated.

TABLE I(a)

2,5-diphenyl-2,5-bis-2-N-butylamino-isopropyl-1,3,4-trithiolane (Example 1)

| No. of tests | Animal | No. | Sex | 6 days Rx | Route | Dose (mg./kg.) | Daily mortality (day/No.) | Cures | 1 MSTT | 2 MSTC | 3 T-C | 4 Tox | 5 MSTX |
|---|---|---|---|---|---|---|---|---|---|---|---|---|---|
| 1 | Mice | 5 | M | 3 | SC | 40 | 06/02 07/02 08/01 | 00 | 6.8 | 6.1 | 0.7 | 00 | 00 |
| 1 | do | 5 | M | 3 | SC | 160 | 07/03 08/02 | 00 | 7.4 | 6.1 | 1.3 | 00 | 00 |
| 1 | do | 5 | M | 3 | SC | 640 | 08/01 09/02 10/02 | 00 | 9.2 | 6.1 | 3.1 | 00 | 00 |
| 1 | do | 5 | M | 3 | SC | 20 | 06/04 07/01 | 00 | 6.2 | 6.1 | 0.1 | 00 | 00 |
| 1 | do | 5 | M | 3 | SC | 40 | 06/03 07/02 | 00 | 6.4 | 6.1 | 0.3 | 00 | 00 |
| 1 | do | 5 | M | 3 | SC | 80 | 06/03 07/02 | 00 | 6.4 | 6.1 | 0.3 | 00 | 00 |
| 1 | do | 5 | M | 3 | SC | 150 | 06/01 07/03 08/01 | 00 | 7.0 | 6.1 | 0.9 | 00 | 00 |
| 1 | do | 5 | M | 3 | SC | 320 | 06/01 07/02 08/01 09/01 | 00 | 7.4 | 6.1 | 1.3 | 00 | 00 |
| 1 | do | 5 | M | 3 | SC | 640 | 09/03 10/02 | 00 | 9.4 | 6.1 | 3.3 | 00 | 00 |

See Notes 1 to 6, Table I.

TABLE II

Alpha, alpha-dimethyl-beta, beta-dimercapto-N-butyl-4-chlorophenethylamine (Example 2)

| No. of tests | Animal | No. | Sex | 6 days Rx | Route | Dose (mg./kg.) | Daily mortality (day/No.) | Cures | 1 MSTT | 2 MSTC | 3 T-C | 4 Tox | 5 MSTX | Result |
|---|---|---|---|---|---|---|---|---|---|---|---|---|---|---|
| 21 | Mice | 5 | M | 3 | SC | 10 | 06/03 07/02 | 00 | 6.4 | 6.2 | 0.2 | 00 | 00 | |
| 21 | do | 5 | M | 3 | SC | 20 | 06/03 07/02 | 00 | 6.4 | 6.2 | 0.2 | 00 | 00 | |
| 21 | do | 5 | M | 3 | SC | 40 | 06/03 07/01 08/01 | 00 | 6.6 | 6.2 | 0.4 | 00 | 00 | |
| 21 | do | 5 | M | 3 | SC | 80 | 06/03 07/01 08/01 | 00 | 6.6 | 6.2 | 0.4 | 00 | 00 | |
| 21 | do | 5 | M | 3 | SC | 160 | 09/01 11/02 13/02 | 00 | 11.4 | 6.2 | 5.2 | 00 | 00 | |
| 21 | do | 5 | M | 3 | SC | 320 | 11/02 12/01 13/01 14/01 | 00 | 12.2 | 6.2 | 6.0 | 00 | 00 | |
| 21 | do | 5 | M | 3 | SC | 640 | 14/01 17/02 19/01 | 01 | 16.8 | 6.2 | 10.6 | 00 | 00 | Cure. |
| 21 | do | 5 | M | 3 | SC | 2.50 | 06/04 07/01 | 00 | 6.2 | 6.2 | 0.0 | 00 | 00 | |
| 21 | do | 5 | M | 3 | SC | 6.00 | 06/04 07/01 | 00 | 6.2 | 6.2 | 0.0 | 00 | 00 | |

See Notes 1 to 6, Table I.

TABLE II(a)

2,5-di-4-chlorophenyl-2,5-bis-2-N-butylaminoisopropyl-1,3,4-trithiolane (Example 2)

| No. of tests | Animal | No. | Sex | 6 days Rx | Route | Dose (mg./kg.) | Daily mortality (day/No.) | Cures | 1 MSTT | 2 MSTC | 3 T-C | 4 Tox | 5 MSTX | Result |
|---|---|---|---|---|---|---|---|---|---|---|---|---|---|---|
| 1 | Mice | 5 | M | 3 | SC | 40 | 06/03 07/02 | 00 | 6.4 | 6.1 | .3 | 00 | 00 | |
| 1 | do | 5 | M | 3 | SC | 160 | 08/01 09/01 10/01 | 00 | 10.0 | 6.1 | 3.9 | 00 | 00 | |
| 1 | do | 5 | M | 3 | SC | 640 | 10/01 13/01 14/03 11/01 12/01 | 00 | 13.0 | 6.1 | 6.9 | 00 | 00 | Active. |
| 3 | do | 5 | F | 3 | SC | 20 | 06/03 07/02 | 00 | 6.4 | 6.1 | .3 | 00 | 00 | |
| 3 | do | 5 | F | 3 | SC | 40 | 06/02 07/03 | 00 | 6.6 | 6.1 | .5 | 00 | 00 | |
| 3 | do | 5 | F | 3 | SC | 80 | 06/02 07/03 | 00 | 6.6 | 6.1 | .5 | 00 | 00 | |
| 3 | do | 5 | F | 3 | SC | 160 | 06/01 07/01 09/01 11/01 12/01 | 00 | 9.0 | 6.1 | 2.9 | 00 | 00 | |
| 3 | do | 5 | F | 3 | SC | 320 | 12/02 13/02 14/01 | 00 | 12.8 | 6.1 | 6.7 | 00 | 00 | Active. |
| 3 | do | 5 | F | 3 | SC | 640 | 12/02 13/01 14/01 15/01 | 00 | 13.2 | 6.1 | 7.1 | 00 | 00 | Do. |

See Notes 1 to 6, Table I.

TABLE III

Alpha, alpha-dimethyl-beta, beta-dimercapto-N-ethyl-4-chlorophenethylamine (Example 3)

| No. of tests | Animal | No. | Sex | 6 days Rx | Route | Dose (mg./kg.) | Daily mortality (day/No.) | Cures | 1 MSTT | 2 MSTC | 3 T-C | 4 Tox | 5 MSTX | Result |
|---|---|---|---|---|---|---|---|---|---|---|---|---|---|---|
| 1 | Mice | 5 | F | 3 | SC | 40 | 08/01 10/02 12/02 | 00 | 10.4 | 6.2 | 4.2 | 00 | 00 | |
| 1 | do | 5 | F | 3 | SC | 160 | 12/02 13/01 14/02 | 00 | 13.0 | 6.2 | 6.8 | 00 | 00 | Active. |
| 1 | do | 5 | F | 3 | SC | 640 | 27/01 29/01 30/01 | 02 | 28.7 | 6.2 | 22.5 | 00 | 00 | Cure. |
| 3 | do | 5 | F | 3 | SC | 20 | 06/03 08/01 10/01 | 00 | 7.2 | 6.2 | 1.0 | 00 | 00 | |
| 3 | do | 5 | F | 3 | SC | 40 | 10/01 11/01 12/02 13/01 | 00 | 11.6 | 6.2 | 5.4 | 00 | 00 | |
| 3 | do | 5 | F | 3 | SC | 80 | 12/01 13/02 14/02 | 00 | 13.2 | 6.2 | 7.0 | 00 | 00 | Active. |
| 3 | do | 5 | F | 3 | SC | 160 | 13/02 14/01 15/01 18/01 | 00 | 14.6 | 6.2 | 8.4 | 00 | 00 | Do. |
| 3 | do | 5 | F | 3 | SC | 320 | 16/01 18/01 20/01 22/01 | 01 | 19.0 | 6.2 | 12.8 | 00 | 00 | Cure. |
| 3 | do | 5 | F | 3 | SC | 640 | 29/01 32/01 | 03 | 30.5 | 6.2 | 24.3 | 00 | 00 | Do. |

See Notes 1 to 6, Table 1.

As can be seen from the foregoing discussion and Tables I, Ia; II, IIa and III, the antimalarial compounds are active in the standard mouse tests. From this, it can be deduced that the compounds are likely to be active in higher mammals such as simians and man.

The following Table IV shows simian antimalarial data of blood induced malaria showing cures at about 30 mg per kg and above.

TABLE IV alpha, alpha-Dimethyl-beta, beta-dimercapto-N-butylphenethylamine

EXAMPLE I

P. cynomolgi
1. 100 mg/kg (oral) daily for 7 days
    2 cured out of 2 animals
2. 31.6 mg/kg (oral) daily for 7 days
    2 cured out of 2 animals
3. 10.6 mg/kg (oral) daily for 7 days
    no effect P. knowlesi
1. 100 mg/kg (oral) daily for 7 days
    1 suppression out of 2 animals alpha, alpha-Dimethyl-beta, beta-dimercapto-N-butyl-(p-chlorophenyl)-ethylamine

EXAMPLE II

P. cynomolgi
1. 100 mg/kg (oral) daily for 7 days,
    2 cured out of 2 animals
2. 31.6 mg/kg (oral) daily for 7 days
    1 cured, 1 marked suppression
3. 10 mg/kg (oral) daily for 7 days
    no effect P. knowlesi
1. 100 mg/kg (oral) daily for 7 days
    2 suppression of of 2 animals
2. 31.6 mg/kg (oral) daily for 7 days
    1 suppression out of 2 animals P. knowlesi, a simian malarial parasite has recently been found as the infecting agent in a human patient. (Resident Physician Vol. 14, No. 11 November 1968). Since considerable numbers of simians used as laboratory animals are infected with malarial parasites, the compounds of the present invention provide a means for their treatment and the prevention of the infection of humans by female anopheline mosquitoes from the simians.

The foregoing description is only illustrative of the present invention and it is intended that this invention be limited only by the hereinafter appended claims.

We claim:
1. The compound of the formula:

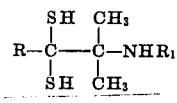

wherein R is phenyl and phenyl substituted with a halogen and wherein $R_1$ is lower alkyl.

2. The compound of claim 1 wherein R is 4-chlorophenyl.

3. The compound of claim 1 wherein R is 4-chlorophenyl and $R_1$ is ethyl.

4. The compound of claim 1 wherein R is 4-chlorophenyl and $R_1$ is n-butyl.

5. The compound of claim 1 wherein R is phenyl and $R_1$ is n-butyl.

* * * * *